United States Patent [19]

Waterhouse

[11] Patent Number: 6,081,393
[45] Date of Patent: Jun. 27, 2000

[54] ADVERTISING PANEL INDICIA MAGNIFYING ILLUMINATOR

[76] Inventor: William H. Waterhouse, P.O. Box 72274, Norman, Okla. 73070

[21] Appl. No.: 09/451,021

[22] Filed: Nov. 29, 1999

[51] Int. Cl.[7] ................................................... G02B 27/02
[52] U.S. Cl. ............................................................. 359/802
[58] Field of Search ..................................... 359/801, 802, 359/803, 806, 808, 809, 810, 811, 819

[56] References Cited

U.S. PATENT DOCUMENTS 5,457,613  10/1995  Vandenbelt et al. ..................... 362/200
5,943,173  12/1998  Waterhouse ............................. 359/802

*Primary Examiner*—Ricky Mack

[57] ABSTRACT

A customer activated indicia magnifying and illuminating device is formed by an upright transparent panel member supported by a transparent semicircular member. The panel member contains a flat battery pack connected with a circuit including a lamp means and normally open switch assembly. The lamp means is energized for illuminating the lens and indicia thereunder by pressure applied to and released from a region on a protective sheet overlying the panel and battery pack.

5 Claims, 2 Drawing Sheets

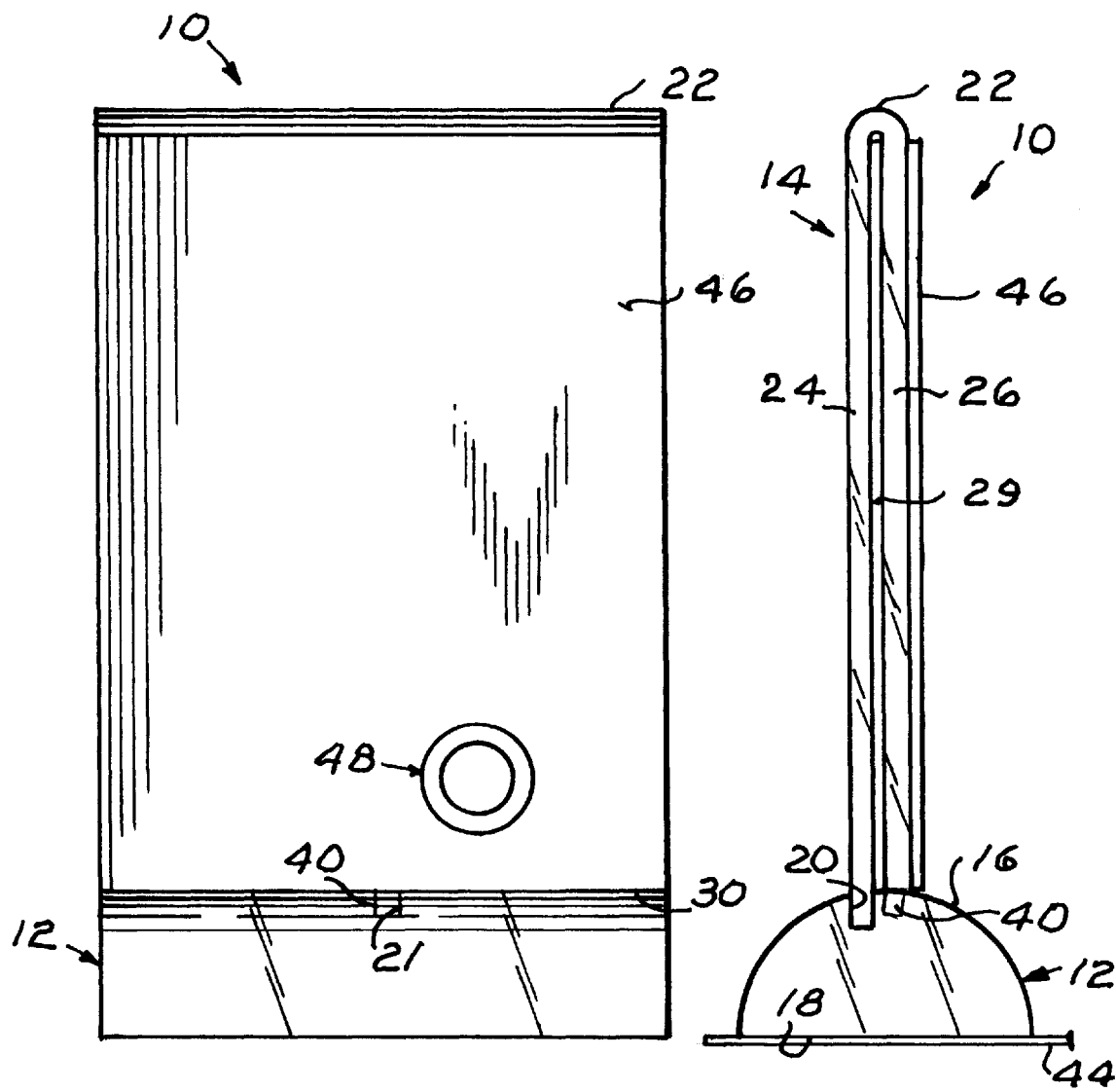

6,081,393

ADVERTISING PANEL INDICIA MAGNIFYING ILLUMINATOR

CROSS REFERENCE TO RELATED APPLICATIONS Not applicable.

STATEMENT REGARDING FEDERALLY SPONSORED RESEARCH OR DEVELOPMENT Not applicable.

BACKGROUND OF THE INVENTION

The present invention relates portable reading devices and more particularly to a combined advertising panel and reading device which includes an illuminating indicia magnifier.

1. Field of the Invention

Many individuals find it difficult to read items charged or a total of sales slip machine printed in restaurants or other eating establishments where the ambient light is dim. A pocket size flashlight is a convenient aid in such situations, but it has a disadvantage of its inconvenient size and shape which spreads considerable light often annoying people in adjacent seats. Even with a flashlight illumination may be insufficient to permit reading fine print.

2. Description of the Prior Art

U.S. Pat. No. 9,543,173, issued Aug. 24, 1999, to Waterhouse discloses an illuminating magnifying lens for reading sales slips in dim light which includes a planar base supporting a generally horizontal frame in turn supporting a magnifying lens disposed transversely of the base and in spaced relation therewith. A lamp circuit illuminates the lens and is energized by an operator for reading indicia on a sales slip interposed between the lens and top surface of the base.

U.S. Pat. No. 2,056,093, issued Oct. 6, 1936, to Stanley; U.S. Pat. No. 5,270,071, issued Oct. 24, 1950 to Pierce; and, U.S. Pat. No. 3,039,350, issued Feb. 19, 1962 to Galhover, are believed accumulative of the remaining prior art patents.

This invention is believed distinctive over the above named patents by providing a semicircular magnifying base member having a flat surface contacting a table top, or the like, with the arcuate upper surface provided with a coextensive longitudinal groove which supports a doubled back upon itself, length of panel material having one end edge portion disposed in the base groove. The panel supports a battery and circuit. The circuit includes a light emitting member illuminating the base and is energized by a customer closed switch.

BRIEF SUMMARY OF THE INVENTION

A semicircular transparent magnifying base member has a flat surface for contiguously contacting a support surface. The arcuate upper surface is provided with a coextensive longitudinal groove receiving one end portion of a doubled back upon itself length of transparent panel material. The other end portion of the panel is recessed and nests a battery pack and electrical circuit. The circuit includes a light emitting means and is energized by a customer closing a switch assembly which illuminates the base and any indicia.

The principal object of the invention is to provide an attractive customer activated table top device for illuminating indicia placed thereunder.

BRIEF DESCRIPTION OF THE SEVERAL VIEWS OF THE DRAWINGS

FIG. 1 is a front elevational view;

FIG. 2 is a left side elevational view;

DETAILED DESCRIPTION OF THE INVENTION

Figures 3, 4:
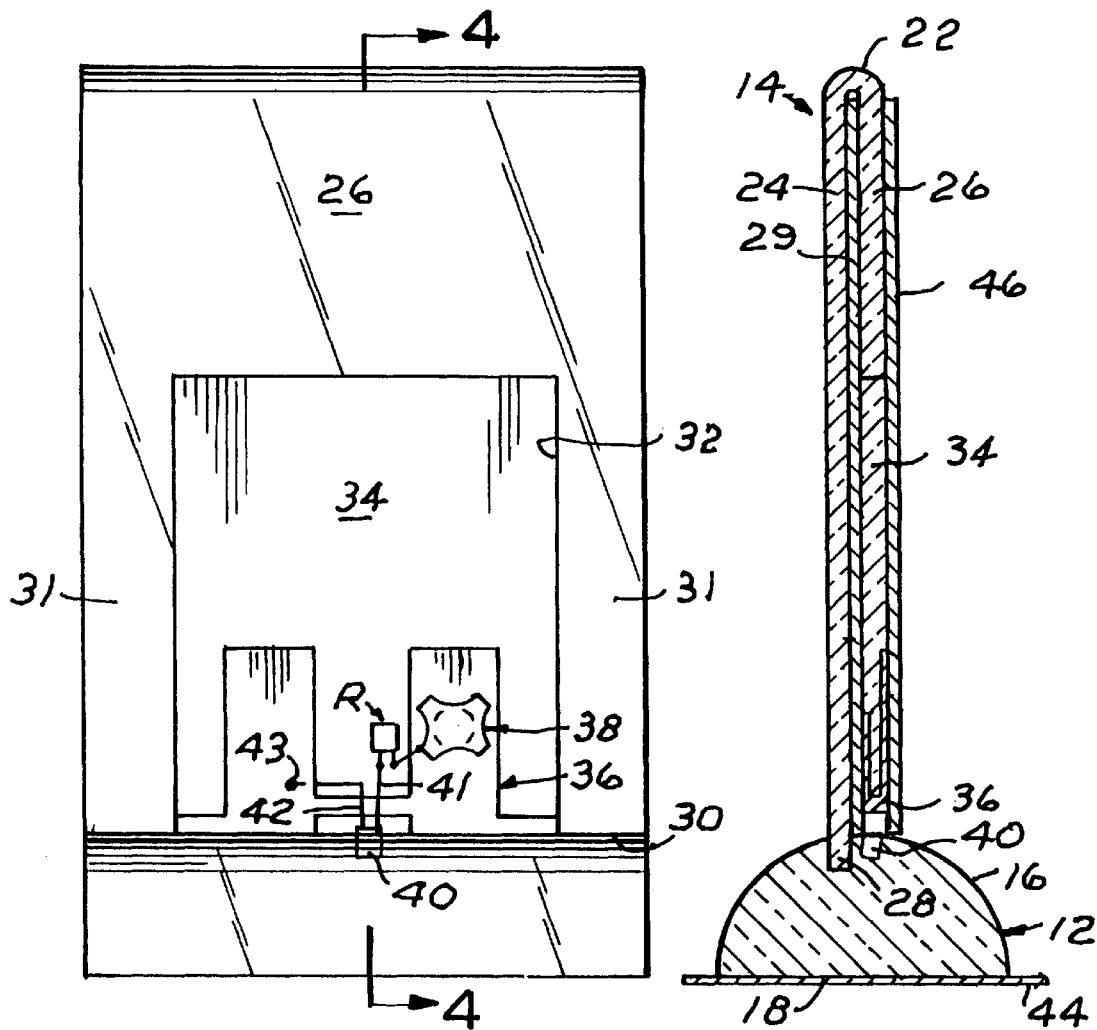
FIG. 3 is a view similar to FIG. 1 with a cover sheet removed.
FIG. 4 is a vertical cross-sectional view taken substantially along the line 4—4, of FIG. 3; and, FIG. 5 is a wiring diagram.
Figure 5:
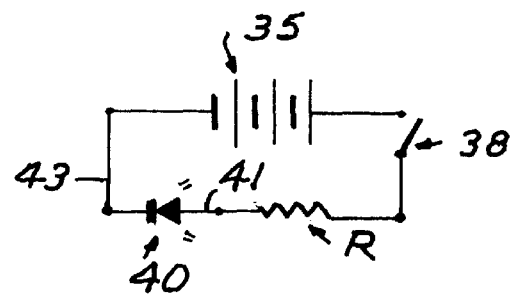

Like characters of reference designate like parts in those figures of the drawings in which they occur.

In the drawings:

The reference numeral 10 indicates the apparatus as a whole which is upright rectangular panel-like in general configuration. The device 10 comprises a base 12 and an up-right panel assembly 14. The base 12 is a magnifying lens of selected length, preferably formed from transparent material having an arcuate upper surface 16 and a horizontal planar base surface 18, formed on a selected radius and semicircular in end view. The base 12 is further provided with a coextensive upperwardly open groove 20 for the purposes presently explained.

The panel assembly 14 is similarly preferably formed from transparent material having a width substantially equal with the length of the base 12 and a selected thickness and length which is double back upon itself substantially medially its ends as at 22, to form a back panel portion 24 and a forward panel 26 with the end portion 28 of the back panel projecting beyond the end limit of the front panel 26 a selected distance substantially equal with the depth of the groove 28 for receiving the depending end portion 28 of the back panel therein and supporting the front panel depending end portion 30 adjacent the upper limit of the base arcuate surface 16. A sheet 29 containing advertising indicia, not shown, is interposed between the panels 24 and 26.

The base 12 is provided with a generally cylindrical upwardly open socket 21, substantially medially its ends adjacent the groove 20 for the purpose presently explained. Prior to doubling the panel back upon itself the forward panel end portion is provided with a rectangular opening 32 defining an end inverted U-shaped configuration for the front panel defined by parallel legs 31.

The opening 32 cooperatively receives a flat battery pack assembly 34, including a battery 35, of substantially equal thickness with respect to the thickness of the panel 26, having a clip member 36 overlying the opposing flat sides of the depending end portion of the battery pack 34, which supports a normally open switch assembly 38 and incandescent lamp (not shown) connected with the battery pack. The battery pack assembly is commercially available from Lumatec Industries Inc., Austin, Tex.

The flashlight battery pack assembly 34 is preferably modified by replacing the original equipment lamp with a light emitting a diode 40 by connecting one of its leads 41 through a resister R in series with one terminal of the switch assembly 38 and connecting its other lead 42 with the negative terminal 43 of the battery pack.

The purpose of utilizing the LED 40 is to direct the lamp light rays emitted thereby more particularly downwardly in base member 12 to illuminate indicia on a sales slip or like 44, thus being less conspicous by not lighting areas adjacent the device 10. The assembled battery pack, switch assembly and circuit is covered from view by a relatively thin opaque protective sheet 46, which may contain advertising indicia or a message, neither being shown, and overlying all or at least a portion of the forward surface of the front panel 26.

The sheet 46 includes a designated region, indicated by the circles 48 (FIG. 1), overlying the customer closed switch assembly 38 as a guide for energizing the lamp 21 for illuminating indicia under the base 12 by applying and releasing pressure to and from the region 48.

Obviously the invention is susceptible to changes or alterations without defeating its practicability. Therefore, I do not wish to be confined to the preferred embodiment(s) shown in the drawing(s) and described herein.

I claim:

1. An illuminated alpha/numeric line magnifier reading device, comprising;

an elongated transparent panel unevenly doubled back upon itself to define one end portion projecting beyond the other end portion, said other end portion having a downwardly open recess;

a semicircular, in transverse cross section, transparent lens having a coextensive upwardly open groove nesting said panel one end portion and having a depending planar surface;

a flat battery pack nested by the recess of said panel other end portion; and, electrical circuit means including a lamp means disposed adjacent the lens and operatively connected with said battery pack.

2. The illuminated reading device according to claim 1 in which the circuit means further includes:

a normally open switch assembly interposed in the circuit.

3. The illuminated reading device according to claim 2 in which said lens is provided with an upwardly open socket intermediate its ends for nesting said lamp means.

4. The illuminated reading device according to claim 3 in which the lamp means includes;

a light emitting diode.

5. The illuminated reading device according to claim 4 and further including:

an opaque protective sheet coextensively overlying said switch assembly and said panel other end portion, said switch assembly being operable for energizing and deenergizing said lamp means by applying and releasing pressure on and from a region of said protective sheet overlying said switch assembly.

* * * * *